United States Patent
Han et al.

(10) Patent No.: US 9,450,498 B2
(45) Date of Patent: Sep. 20, 2016

(54) MULTI-OUTPUT POWER SUPPLY

(71) Applicant: SAMSUNG ELECTRO-MECHANICS CO., LTD., Suwon, Gyunggi-do (KR)

(72) Inventors: Dae Hoon Han, Gyunggi-do (KR); Seo Hyung Kim, Gyunggi-do (KR); Jae Shin Lee, Gyunggi-do (KR); Joon Youp Sung, Gyunggi-do (KR); Bo Hyun Hwang, Gyunggi-do (KR); Jung Sun Kwon, Gyunggi-do (KR)

(73) Assignee: SOLUM CO., LTD, Suwon-Si, Gyeonggi-Do (KR)

( * ) Notice: Subject to any disclaimer, the term of this patent is extended or adjusted under 35 U.S.C. 154(b) by 884 days.

(21) Appl. No.: 13/763,956

(22) Filed: Feb. 11, 2013

(65) Prior Publication Data

US 2014/0139021 A1 May 22, 2014

(30) Foreign Application Priority Data

Nov. 20, 2012 (KR) .................. 10-2012-0131932

(51) Int. Cl.
*H02M 3/335* (2006.01)

(52) U.S. Cl.
CPC ....... *H02M 3/33561* (2013.01); *Y10T 307/406* (2015.04)

(58) Field of Classification Search
CPC .............. H02M 3/33561; H02M 2001/009; H02J 3/14; H02J 3/12; H02J 1/14; Y10T 307/43; Y10T 307/406; Y10T 307/469
USPC ........................................ 307/31, 34, 38, 39
See application file for complete search history.

(56) References Cited

U.S. PATENT DOCUMENTS

| 5,754,416 A | 5/1998 | Lim et al. |
| 6,297,976 B1 | 10/2001 | Isono |
| 6,344,979 B1 | 2/2002 | Huang et al. |

(Continued)

FOREIGN PATENT DOCUMENTS

| CN | 1368787 A | 9/2002 |
| CN | 101969270 A | 2/2011 |

(Continued)

OTHER PUBLICATIONS

Chinese Office Action issued in Chinese Patent Application No. 201310054882.5, dated Dec. 2, 2015.

*Primary Examiner* — Rexford Barnie
*Assistant Examiner* — Terrence Willoughby
(74) *Attorney, Agent, or Firm* — McDermott Will & Emery LLP

(57) ABSTRACT

There is provided a multi-output power supply capable of maintaining power balancing between multiple output powers by fixing a switching duty until a voltage level reaches a predetermined voltage level during an initial stage of a soft-start operation, the multi-output power supply including a power supply unit switching an input power and outputting a plurality of powers having levels determined according to the switching, and a controller controlling a soft switching operation of the power supply unit during an initial operation and fixing a switching duty of the power supply unit to a preset switching duty according to a result of a comparison between a preset reference voltage level and an operating voltage determining whether the soft switching operation is performed or not during the soft switching operation.

12 Claims, 3 Drawing Sheets

(56) References Cited

U.S. PATENT DOCUMENTS

| | | | |
|---|---|---|---|
| 7,646,181 B2 | 1/2010 | Cheon et al. | |
| 8,018,740 B2 | 9/2011 | Sun et al. | |
| 2003/0020442 A1* | 1/2003 | Hwang | H02M 1/0845 323/288 |
| 2004/0032754 A1* | 2/2004 | Yang | H02M 1/32 363/56.09 |
| 2006/0152947 A1* | 7/2006 | Baker | H02M 1/4241 363/16 |
| 2006/0187686 A1 | 8/2006 | Sun et al. | |
| 2011/0057635 A1* | 3/2011 | Ishikawa | H02M 1/36 323/282 |
| 2012/0250360 A1 | 10/2012 | Orr et al. | |

FOREIGN PATENT DOCUMENTS

| | | |
|---|---|---|
| CN | 102783004 A | 11/2012 |
| JP | 2003088118 A | 3/2003 |
| KR | 1997-0024580 | 6/1997 |
| KR | 10-2009-0102948 | 10/2009 |

* cited by examiner

MULTI-OUTPUT POWER SUPPLY

CROSS-REFERENCE TO RELATED APPLICATIONS

This application claims the priority of Korean Patent Application No. 10-2012-0131932 filed on Nov. 20, 2012, in the Korean Intellectual Property Office, the disclosure of which is incorporated herein by references.

BACKGROUND OF THE INVENTION

1. Field of the Invention

The present invention relates to a multi-output power supply for preventing power imbalances between multiple outputs during an initial driving operation.

2. Description of the Related Art

In general, a power supply has been widely used in commercially-used electronic devices in addition to devices such as personal computers, and domestic appliances such as air conditioners, stereo systems, and audio-visual devices, in the past.

A power supply may supply a plurality of output power sources according to an electronic product to which the power supply is applied.

A general multi-output power supply converts input power into alternating current (AC) powers through a transformer and then rectifies the AC powers to output a plurality of direct current (DC) powers.

However, in the general multi-output power supply, when a voltage level of a single DC power among a plurality of DC powers is changed by the transformer, the remaining DC powers are affected by the change in the voltage level, and thus, cross-regulation may not be maintained.

To this end, a buck chopper circuit is used in an output terminal of the multi-output power supply.

A buck chopper circuit may include a switch, a diode for free wheeling, and a filter.

Thus, the general multi-power supply primarily converts power and then reconverts the power using the buck chopper circuit, thereby being reduced in power conversion efficiency. In addition, the number of components may be increased due to the presence of the buck chopper circuit configured as described above, thereby increasing manufacturing costs.

To overcome this problem, the Cited Reference below discloses a multi-output power supply for controlling switching of an output terminal thereof in synchronization with a switching signal of a power converting terminal.

The multi-output power supply performs a soft switching operation to stably supply power during an initial operation. In this case, power imbalances between multiple output powers may occur due to an imbalance in a switching duty ratio.

RELATED ART DOCUMENT (Patent Document 1) Korean Patent Laid-Open Publication No. 10-2009-0102948

SUMMARY OF THE INVENTION

An aspect of the present invention provides a multi-output power supply capable of maintaining power balancing between multiple output powers by fixing a switching duty until a voltage level reaches a predetermined voltage level during an initial stage of a soft-start operation.

According to an aspect of the present invention, there is provided a multi-output power supply, including: a power supply unit switching an input power and outputting a plurality of powers having levels determined according to the switching; and a controller controlling a soft switching operation of the power supply unit during an initial operation and fixing a switching duty of the power supply unit to a preset switching duty according to a result of a comparison between a preset reference voltage level and an operating voltage determining whether the soft switching operation is performed or not during the soft switching operation.

The controller may include a current generating unit generating a current according to a power state of at least a portion of the plurality of powers output from the power supply unit; a signal generating unit generating a pulse signal having a frequency determined according to the current generated by the current generating unit; a monostable unit determining a timing of a signal according to the pulse signal of the signal generating unit; a driver generating a switching signal controlling switching of a switching unit according to the timing of the monostable unit; and a voltage selecting unit selecting one voltage among a preset soft-start reference voltage and the operating voltage having a voltage level determined according to the power state of the at least a portion of the plurality of powers.

The signal generating unit may control a duty of the pulse signal according to a level of the voltage selected by the voltage selecting unit.

The voltage selecting unit may select the soft-start reference voltage when the operating voltage is lower than the soft-start reference voltage, and selects the operating voltage when the operating voltage is equal to or higher than the soft-start reference voltage.

The power supply unit may include a switching unit including at least two switches connected in series between a ground and an input power terminal to which the input power is input and switching the input power; a transformer transforming a voltage level of the power switched by the switching unit; and an outputting unit stabilizing the power output from the transformer and outputting a plurality of preset powers.

The transformer may include a resonance tank providing an inductor-inductor-capacitor (LLC) resonance operation for the switching unit; and a transformer including a primary winding receiving the power switched by the switching unit and a plurality of secondary windings individually forming a predetermined turns ratio with the primary winding to output the plurality of powers.

The power supply unit may include a rectifying and smoothing unit rectifying and smoothing an alternating current (AC) power; and a power factor correcting unit correcting a power factor of a direct current (DC) power obtained by the rectifying and smoothing unit and supplying the DC power to the switching unit.

According to another aspect of the present invention, there is provided a multi-output power supply, including: a power supply unit switching an input power and outputting a first power and a second power having levels determined according to the switching; and a controller controlling a soft switching operation of the power supply unit during an initial operation and fixing a switching duty of the power supply unit to a preset switching duty according to a result of a comparison between a preset reference voltage level and an operating voltage determining whether the soft switching operation is performed or not during the soft switching operation.

The controller may include a current generating unit generating a current according to a power state of the second power output from the power supply unit; a signal generating unit generating a pulse signal having a frequency determined according to the current generated by the current generating unit; a monostable unit determining a timing of a signal according to the pulse signal of the signal generating unit; a driver generating a switching signal controlling switching of a switching unit according to the timing of the monostable unit; and a voltage selecting unit selecting one voltage among a preset soft-start reference voltage and the operating voltage having a voltage level determined according to the power state of the second power.

The power supply unit may include a switching unit including at least two switches connected in series between a ground and an input power terminal to which the input power is input and switching the input power; a transformer transforming a voltage level of the power switched by the switching unit; a first outputting unit stabilizing the power output from the transformer and outputting a preset first power; and a second outputting unit stabilizing the power output from the transformer and outputting a preset second power.

The transformer may include a resonance tank providing an inductor-inductor-capacitor (LLC) resonance operation for the switching unit; and a transformer including a primary winding receiving the power switched by the switching unit and first and second secondary windings individually forming a predetermined turns ratio with the primary winding to output the first power and second power.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Figure 1:
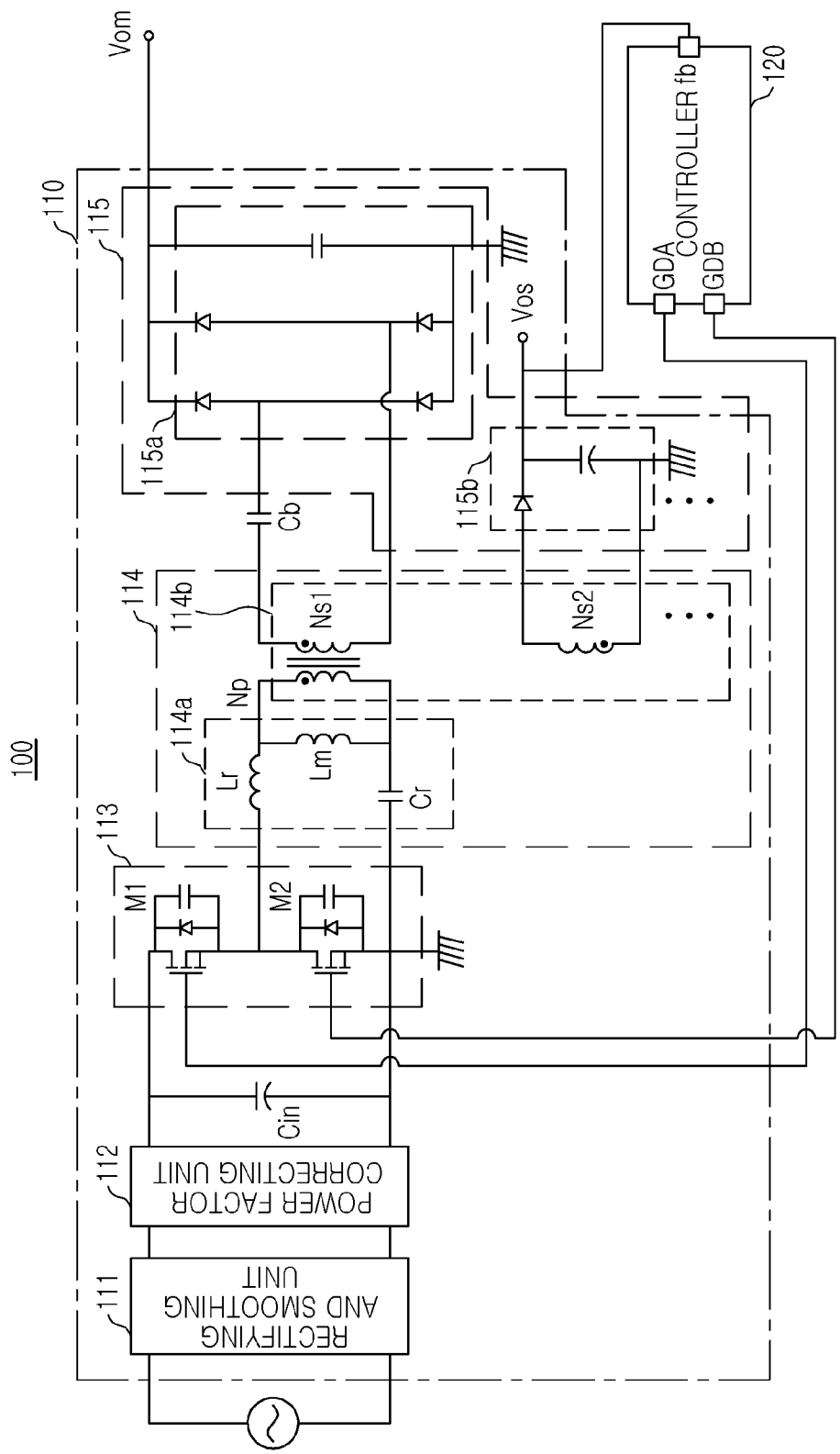
FIG. 1 is a schematic diagram illustrating a structure of a multi-output power supply according to an embodiment of the present invention.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like elements.

FIG. 1 is a schematic diagram illustrating a structure of a multi-output power supply according to an embodiment of the present invention.

Referring to FIG. 1, a multi-output power supply 100 may include a power supply unit 110 and a controller 120.

The power supply unit 110 may include a switching unit 113, a transformer 114, and an outputting unit 115 and may further include a rectifying and smoothing unit 111 and a power factor correcting unit 112.

The rectifying and smoothing unit 111 may rectify and smooth alternating current (AC) power and may transmit the AC power to the power factor correcting unit 112. The power factor correcting unit 112 may correct a power factor of the power by adjusting a phase difference between a voltage and a current of the power rectified by the rectifying and smoothing unit 111, and further, may correct the power factor of the power by adjusting the rectified power such that a current waveform thereof may follow a voltage waveform thereof.

The switching unit 113 may include at least two switches, that is, first and second switches M1 and M2 that are stacked between a ground and an input power terminal to which direct current (DC) power is input from the power factor correcting unit 112. A power converting operation may be performed by an alternating switching operation of the first switch M1 and the second switch M2.

The transformer 114 may include a resonance tank 114a and a transformer 114b. The resonance tank 114a may provide an inductor-inductor-capacitor Lr, Lm, and Cr (LLC) resonance operation. An inductor Lm among the inductor-inductor-capacitor Lr, Lm, and Cr (LLC) may be a magnetized inductor of the transformer 114b.

The transformer 114b may include a primary winding Np and a plurality of secondary windings Ns1 and Ns2. The primary winding Np and the secondary windings Ns1 and Ns2 may be electrically insulated from each other. That is, the primary winding Np may be positioned on a primary side and the secondary windings Ns1 and Ns2 may be positioned on a secondary side, grounds of the primary side and the second side having different electrical properties.

A turns ratio between the primary winding Np and the secondary windings Ns1 and Ns2 may be previously set. The secondary windings Ns1 and Ns2 may have voltage levels varied according to the turns ratio and may perform a power output operation.

The outputting unit 115 may stabilize the power output from the secondary windings Ns1 and Ns2 to output a plurality of DC powers Vom and Vos and may include a plurality of outputting units 115a and 115b corresponding to the secondary windings Ns1 and Ns2, respectively.

For example, when the plurality of secondary windings Ns1 and Ns2 are a first secondary winding Ns1 and a second secondary winding Ns2, the outputting unit 115 may include a first outputting unit 115a and a second outputting unit 115b.

That is, the first outputting unit 115a may rectify and stabilize the power from the first secondary winding Ns1 to output a first power Vom. The second outputting unit 115b may rectify and stabilize the power from the second secondary winding Ns2 to output a second power Vos.

The controller 120 may be formed on the secondary side and may receive a power state from the second outputting unit 115b to control a switching duty of the switching unit 113 formed on the primary side.

In detail, the controller 120 may control the switching duty of the switching unit 113 according to a feedback signal fb detecting a power state of the second power Vos of the second outputting unit 115b to control a level of the second power Vos.

On the other hand, although not shown, the controller 120 may control a switching frequency of the switching unit 113 according to a feedback signal detecting a power state of the first power Vom of the first outputting unit 115a to control a level of the first power Vom.

The multi-output power supply 100 may perform a soft-start operation during an initial power supplying operation such that the levels of the first and second powers Vom and Vos may stably reach levels desired by users.

In this case, the switching duty of the switching unit 113 may be fixed until a voltage level reaches a predetermined voltage level in order to maintain power balances between the first and second powers Vom and Vos during a soft switching operation, which will be described in detail with reference to FIG. 2.

Figure 2:
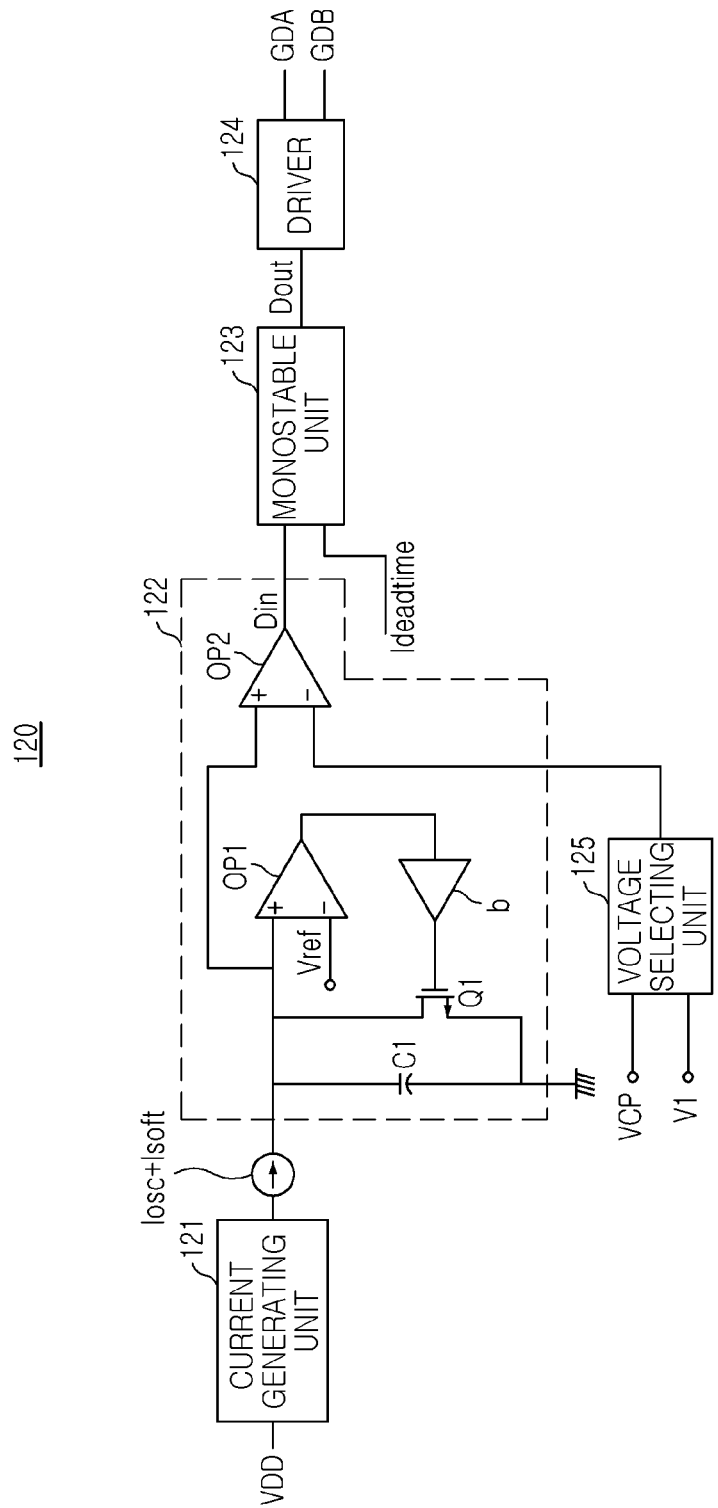
FIG. 2 is a schematic diagram illustrating a structure of a controller used in the multi-output power supply according to the embodiment of the present invention.
Figure 3:
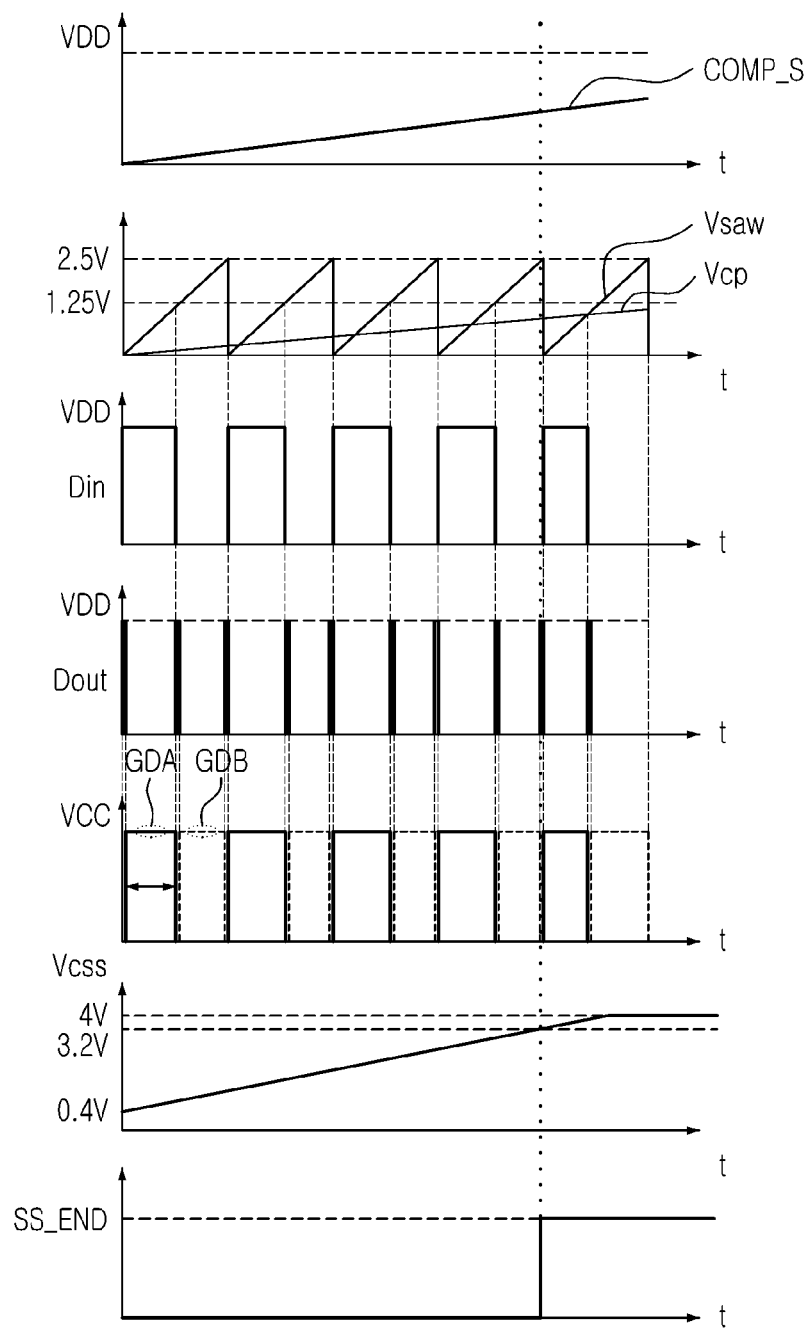
FIG. 3 is a waveform diagram of an operation of main components of the multi-output power supply according to the embodiment of the present invention.

FIG. 2 is a schematic diagram illustrating a structure of a controller used in the multi-output power supply according to the embodiment of the present invention; and FIG. 3 is a waveform diagram of an operation of main components of the multi-output power supply according to the embodiment of the present invention.

Referring to FIG. 2, the controller 120 of the multi-output power supply may include a current generating unit 121, a signal generating unit 122, a monostable unit 123, a driver 124, and a voltage selecting unit 125.

The current generating unit 121 may receive a voltage VDD to generate a current and may transmit the current to the signal generating unit 122. The current generating unit 121 may supply a steady state current Iosc during a steady state operation and may further supply a soft-start current Isoft during the soft-start operation.

The signal generating unit 122 may include a capacitor C1, a switch Q1, a first comparer op1, a second comparer op2, and a buffer b. The signal generating unit 122 may generate a sawtooth signal according to the current charged in the capacitor C1 and may transmit a pulse signal depending on the sawtooth signal to the monostable unit 123.

In detail, the capacitor C1 may charge and discharge the current transferred from the current generating unit 121 according to a switching operation of the switch Q1. The first comparer op1 may compare a preset first reference voltage Vref (for example, 2.5 V) with a voltage level of a voltage charged in the capacitor C1 and may control the switching operation of the switch Q1 according to the comparison result. The buffer b may buffer a signal according to the comparison result of the first comparer op1 and may transmit the signal to the switch Q1.

Thus, the voltage level of the capacitor C1 may have a shape, as shown in a sawtooth signal Vsaw of FIG. 3. The second comparer op2 may compare the sawtooth signal Vsaw with a voltage selected by the voltage selecting unit 125 to provide a pulse signal Din to the monostable unit 123.

The monostable unit 123 may receive the pulse signal Din and a preset deadtime Ideadtime and transmit a pulse signal having the deadtime Ideadtime to the driver 124. The driver 124 may provide switching control signals GDA and GDB for driving the first and second switches M1 and M2 of the switching unit 113, based on the pulse signal from the monostable unit 123.

That is, a period of time in which the capacitor C1 is charged with the current is controlled by a level of the steady state current Iosc from the current generating unit 121, thereby controlling a frequency of the switching control signals GDA and GDB.

The voltage selecting unit 125 may selectively provide a voltage such that a duty of the switching control signals GDA and GDB is fixed until a voltage level thereof reaches a predetermined voltage level during the soft-start operation.

That is, referring to FIG. 3, as a voltage level of the second power Vos increases, a first voltage COMP_S determining a duty of the switching control signal GDA in the controller 120 increases, and thus, a second voltage Vcp determining the duty of the switching control signal GDA increases.

Lastly, the duty of the switching control signal GDA may be determined according to a comparison result of the second voltage Vcp and the sawtooth signal Vsaw. In this regard, a voltage level of the second voltage Vcp is low in the initial stage of the soft-start operation, and thus, the duty of the switching control signal GDA is low, thereby resulting in power imbalances between the first power Vom and the second power Vos.

Accordingly, the voltage selecting unit 125 may provide a soft-start reference voltage V1 to the signal generating unit 122 while the second voltage Vcp is increased to a predetermined voltage level or more. For example, the soft-start reference voltage V1 of 1.25 V may be provided to the signal generating unit 122 to fix the duty of the switching control signal GDA.

This operation may be performed until an internal voltage Vcss based on a detected voltage of the second power Vos reaches a predetermined voltage level. For example, when a voltage level of the internal voltage Vcss reaches 3.2 V or more, a control signal SS_END stopping the above operation for fixing the duty may be provided, such that the soft start operation in which the duty of the switching control signal GDA is varied may be undertaken. Then, when the soft start operation is stopped, the provision of soft start current Isoft may be stopped such that only the steady state current Iosc may be supplied to the signal generating unit 122 so as to perform a normal power supplying operation.

As set forth above, according to the embodiments of the present invention, a switching duty may be fixed until a voltage level reaches a predetermined voltage level during an initial stage of a soft start operation to maintain power balancing between multiple output powers.

While the present invention has been shown and described in connection with the embodiments, it will be apparent to those skilled in the art that modifications and variations can be made without departing from the spirit and scope of the invention as defined by the appended claims.

What is claimed is:

1. A multi-output power supply, comprising:
a power supply unit switching an input power and outputting a plurality of powers having levels determined according to the switching; and
a controller controlling a soft switching operation of the power supply unit during an initial operation and fixing a switching duty of the power supply unit according to a result of a comparison between a preset reference voltage and an operating voltage determining whether the soft switching operation is performed until a voltage level reaches a predetermined level,
wherein the controller includes:
a current generating unit generating a current according to a power state of at least a portion of the plurality of powers output from the power supply unit;
a signal generating unit generating a pulse signal having a frequency determined according to the current generated by the current generating unit;
a monostable unit determining a timing of a signal according to the pulse signal of the signal generating unit;
a driver generating a switching signal controlling switching of a switching unit according to the timing of the monostable unit; and a voltage selecting unit selecting one voltage among a preset soft-start reference voltage and the operating voltage having a voltage level determined according to the power state of the at least a portion of the plurality of powers.

2. The multi-output power supply of claim 1, wherein the signal generating unit controls a duty of the pulse signal according to a level of the voltage selected by the voltage selecting unit.

3. The multi-output power supply of claim 1, wherein the voltage selecting unit selects the soft-start reference voltage when the operating voltage is lower than the preset reference voltage, and selects the operating voltage when the operating voltage is equal to or higher than preset reference voltage.

4. The multi-output power supply of claim 1, wherein the power supply unit includes:
a switching unit including at least two switches connected in series between a ground and an input power terminal to which the input power is input and switching the input power;
a transformer transforming a voltage level of the power switched by the switching unit; and
an outputting unit stabilizing the power output from the transformer and outputting a plurality of preset powers.

5. The multi-output power supply of claim 4, wherein the transformer includes:
a resonance tank providing an inductor-inductor-capacitor (LLC) resonance operation for the switching unit; and
a transformer including a primary winding receiving the power switched by the switching unit and a plurality of secondary windings individually forming a predetermined turns ratio with the primary winding to output the plurality of powers.

6. The multi-output power supply of claim 4, wherein the power supply unit includes:
a rectifying and smoothing unit rectifying and smoothing an alternating current (AC) power; and
a power factor correcting unit correcting a power factor of a direct current (DC) power obtained by the rectifying and smoothing unit and supplying the DC power to the switching unit.

7. A multi-output power supply, comprising:
a power supply unit switching an input power and outputting a first power and a second power having levels determined according to the switching; and
a controller controlling a soft switching operation of the power supply unit during an initial operation and fixing a switching duty of the power supply unit according to a result of a comparison between a preset reference voltage and an operating voltage determining whether the soft switching operation is performed until a voltage level reaches a predetermined level,
wherein the controller includes:
a current generating unit generating a current according to a power state of the second power output from the power supply unit;
a signal generating unit generating a pulse signal having a frequency determined according to the current generated by the current generating unit;
a monostable unit determining a timing of a signal according to the pulse signal of the signal generating unit;
a driver generating a switching signal controlling switching of a switching unit according to the timing of the monostable unit; and
a voltage selecting unit selecting one voltage among a preset soft-start reference voltage and the operating voltage having a voltage level determined according to the power state of the second power.

8. The multi-output power supply of claim 7, wherein the signal generating unit controls a duty of the pulse signal according to a level of the voltage selected by the voltage selecting unit.

9. The multi-output power supply of claim 7, wherein the voltage selecting unit selects the soft-start reference voltage when the operating voltage is lower than the preset reference voltage, and selects the operating voltage when the operating voltage is equal to or higher than preset reference voltage.

10. The multi-output power supply of claim 7, wherein the power supply unit includes:
a switching unit including at least two switches connected in series between a ground and an input power terminal to which the input power is input and switching the input power;
a transformer transforming a voltage level of the power switched by the switching unit;
a first outputting unit stabilizing the power output from the transformer and outputting a preset first power; and
a second outputting unit stabilizing the power output from the transformer and outputting a preset second power.

11. The multi-output power supply of claim 10, wherein the transformer includes:
a resonance tank providing an inductor-inductor-capacitor (LLC) resonance operation for the switching unit; and
a transformer including a primary winding receiving the power switched by the switching unit and first and second secondary windings individually forming a predetermined turns ratio with the primary winding to output the first power and second power.

12. The multi-output power supply of claim 10, wherein the power supply unit includes:
a rectifying and smoothing unit rectifying and smoothing an alternating current (AC) power; and
a power factor correcting unit correcting a power factor of a direct current (DC) power obtained by the rectifying and smoothing unit and supplying the DC power to the switching unit.

* * * * *